UNITED STATES PATENT OFFICE.

JOHN J. SCHILLINGER, OF NEW YORK, N. Y.

IMPROVEMENT IN THE MANUFACTURE OF ARTIFICIAL STONE.

Specification forming part of Letters Patent No. 88,747, dated April 6, 1869.

*To all whom it may concern:*

Be it known that I, JOHN J. SCHILLINGER, of New York, in the county and State of New York, have invented a new and Improved Artificial Stone; and I do hereby declare that the following is a full and exact description of the same.

The nature of my invention consists in forming the body of the artificial stone of coarse sand and cement, to which stones, gravel, or equivalent materials may be added, mixed together with lime-water to form a coherent mass, and then facing this stone by another composition made of very fine sand, cement, and dry pulverized metallic paint, mixed with sufficient lime-water, adding any coloring material which may be desired.

The materials forming the body of the stone consist of about four (4) parts of coarse sand, and one (1) part of common cement, to which stones, gravel, or similar substances may be added. This mass, after being thoroughly mixed with sufficient lime-water to form a coherent mass, is put into a mold of the desired form and size, and filled up till within about one-quarter ($\frac{1}{4}$) of an inch of the top of the mold, which space is then filled up by the facing material.

This facing mass or material consists of about two (2) parts of very fine sand, one (1) part of cement, and one (1) part of dry pulverized metallic paint, to which any desired coloring matter may be added, and mixed thoroughly with sufficient lime-water to form a coherent mass.

If the face of the stone is to be made with any molding or ornamental design, the design must be made in the bottom of the mold, and the facing material is then put into the mold first, about one inch or more deep, and then the coarser material filled in until the mold is full. The mold is then closed by a cover, and reversed, so as to bring the molded part or face of the stone upward, to allow the heavier and coarser part to settle a little, after which the mold is turned again to bring the face of the stone downward again, and the mass allowed partially to dry in the mold, when the stone is taken out of the mold and allowed to dry in the atmosphere. I prefer to effect this in well-ventilated sheds protected from the direct action of the sun.

When the stone is nearly dry the face of the same is watered or washed several times with a thin solution of silicate of soda or silicate of potash.

Common lime and quicklime has been before used as one of the ingredients for making artificial stones; but I consider the use of lime-water a great improvement, as by its use the particles of lime are more evenly distributed and mixed with the other ingredients.

I do not claim, broadly, the use of sand and cement in the manufacture of artificial stones, as the same, or almost their equivalents, are used in all artificial stones of which they form the principal basis; but,

What I claim as my invention, and desire to secure by Letters Patent, is—

The manufacture of artificial stones of two different compositions, a coarser and a finer or facing material, when the latter consists of very fine sand, cement, and pulverized metallic paint, with or without coloring matter, mixed with lime-water and applied to the coarser mass, in the manner and for the purpose substantially as herein set forth and described.

JOHN J. SCHILLINGER.

Witnesses:
 HENRY E. ROEDER,
 LOUIS STUMM.